(12) United States Patent
Ma et al.

(10) Patent No.: US 9,343,094 B1
(45) Date of Patent: May 17, 2016

(54) DATA STORAGE DEVICE FILTERING BURST CORRECTION VALUES BEFORE DOWNSAMPLING THE BURST CORRECTION VALUES

(71) Applicant: Western Digital Technologies, Inc., Irvine, CA (US)

(72) Inventors: Kun Ma, Singapore (SG); Jianyi Wang, Singapore (SG); Hui Li, Singapore (SG); Wai Ee Wong, Singapore (SG); Guoxiao Guo, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/669,724

(22) Filed: Mar. 26, 2015

(51) Int. Cl.
*G11B 5/596* (2006.01)

(52) U.S. Cl.
CPC ........ *G11B 5/59627* (2013.01); *G11B 5/59622* (2013.01); *G11B 5/59688* (2013.01)

(58) Field of Classification Search
None
See application file for complete search history.

(56) References Cited

U.S. PATENT DOCUMENTS

| | | | |
|---|---|---|---|
| 6,014,283 A | 1/2000 | Codilian et al. | |
| 6,052,076 A | 4/2000 | Patton, III et al. | |
| 6,052,250 A | 4/2000 | Golowka et al. | |
| 6,061,200 A * | 5/2000 | Shepherd et al. | 360/77.04 |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,462,896 B1 | 10/2002 | Codilian et al. | |

(Continued)

OTHER PUBLICATIONS

Stanley H. Shepherd, et al., U.S. Appl. No. 14/669,994, filed Mar. 26, 2015, 25 pages.

*Primary Examiner* — Wayne Young
*Assistant Examiner* — James L Habermehl

(57) ABSTRACT

A data storage device is disclosed comprising a head actuated over a disk comprising a plurality of servo tracks defined by servo bursts. A number of burst correction values are generated by reading at least one of the servo bursts at a number of different radial locations across the disk. The burst correction values are filtered to generate filtered burst correction values, and the filtered burst correction values are downsampled to generate downsampled burst correction values. The downsampled burst correction values are written to the disk, and the head is servoed over the disk by reading the downsampled burst correction values from the disk.

14 Claims, 7 Drawing Sheets

(56) References Cited

U.S. PATENT DOCUMENTS

| | | | |
|---|---|---|---|
| 6,476,996 B1 | 11/2002 | Ryan | |
| 6,484,577 B1 | 11/2002 | Bennett | |
| 6,493,169 B1 | 12/2002 | Ferris et al. | |
| 6,493,173 B1 | 12/2002 | Kim et al. | |
| 6,496,324 B1 | 12/2002 | Golowka et al. | |
| 6,498,698 B1 | 12/2002 | Golowka et al. | |
| 6,507,450 B1 | 1/2003 | Elliott | |
| 6,510,017 B1 * | 1/2003 | Abdelnour | 360/77.04 |
| 6,534,936 B2 | 3/2003 | Messenger et al. | |
| 6,538,839 B1 | 3/2003 | Ryan | |
| 6,545,835 B1 | 4/2003 | Codilian et al. | |
| 6,549,359 B1 | 4/2003 | Bennett et al. | |
| 6,549,361 B1 | 4/2003 | Bennett et al. | |
| 6,549,362 B1 | 4/2003 | Melrose et al. | |
| 6,560,056 B1 | 5/2003 | Ryan | |
| 6,568,268 B1 | 5/2003 | Bennett | |
| 6,574,062 B1 | 6/2003 | Bennett et al. | |
| 6,574,067 B2 * | 6/2003 | Chen et al. | 360/77.04 |
| 6,577,465 B1 | 6/2003 | Bennett et al. | |
| 6,606,215 B1 * | 8/2003 | Eddy et al. | 360/77.04 |
| 6,614,615 B1 | 9/2003 | Ju et al. | |
| 6,614,618 B1 | 9/2003 | Sheh et al. | |
| 6,636,377 B1 | 10/2003 | Yu et al. | |
| 6,657,810 B1 | 12/2003 | Kupferman | |
| 6,671,119 B2 | 12/2003 | Baumann et al. | |
| 6,690,536 B1 | 2/2004 | Ryan | |
| 6,693,764 B1 | 2/2004 | Sheh et al. | |
| 6,707,635 B1 | 3/2004 | Codilian et al. | |
| 6,710,953 B1 | 3/2004 | Vallis et al. | |
| 6,710,966 B1 | 3/2004 | Codilian et al. | |
| 6,714,371 B1 | 3/2004 | Codilian | |
| 6,714,372 B1 | 3/2004 | Codilian et al. | |
| 6,724,564 B1 | 4/2004 | Codilian et al. | |
| 6,731,450 B1 | 5/2004 | Codilian et al. | |
| 6,735,041 B1 | 5/2004 | Codilian et al. | |
| 6,738,220 B1 | 5/2004 | Codilian | |
| 6,747,837 B1 | 6/2004 | Bennett | |
| 6,760,186 B1 | 7/2004 | Codilian et al. | |
| 6,788,483 B1 | 9/2004 | Ferris et al. | |
| 6,791,785 B1 | 9/2004 | Messenger et al. | |
| 6,795,268 B1 | 9/2004 | Ryan | |
| 6,819,518 B1 | 11/2004 | Melkote et al. | |
| 6,826,006 B1 | 11/2004 | Melkote et al. | |
| 6,826,007 B1 | 11/2004 | Patton, III | |
| 6,847,502 B1 | 1/2005 | Codilian | |
| 6,850,383 B1 | 2/2005 | Bennett | |
| 6,850,384 B1 | 2/2005 | Bennett | |
| 6,867,944 B1 | 3/2005 | Ryan | |
| 6,876,508 B1 | 4/2005 | Patton, III et al. | |
| 6,882,496 B1 | 4/2005 | Codilian et al. | |
| 6,885,514 B1 | 4/2005 | Codilian et al. | |
| 6,900,958 B1 | 5/2005 | Yi et al. | |
| 6,900,959 B1 | 5/2005 | Gardner et al. | |
| 6,903,897 B1 | 6/2005 | Wang et al. | |
| 6,912,099 B2 | 6/2005 | Annampedu et al. | |
| 6,914,740 B1 | 7/2005 | Tu et al. | |
| 6,914,743 B1 | 7/2005 | Narayana et al. | |
| 6,920,004 B1 | 7/2005 | Codilian et al. | |
| 6,922,304 B2 * | 7/2005 | Nakagawa | 360/77.04 |
| 6,924,959 B1 | 8/2005 | Melkote et al. | |
| 6,924,960 B1 | 8/2005 | Melkote et al. | |
| 6,924,961 B1 | 8/2005 | Melkote et al. | |
| 6,934,114 B1 | 8/2005 | Codilian et al. | |
| 6,934,135 B1 | 8/2005 | Ryan | |
| 6,937,420 B1 | 8/2005 | McNab et al. | |
| 6,937,423 B1 | 8/2005 | Ngo et al. | |
| 6,950,273 B2 * | 9/2005 | Nakagawa et al. | 360/78.14 |
| 6,952,322 B1 | 10/2005 | Codilian et al. | |
| 6,954,324 B1 | 10/2005 | Tu et al. | |
| 6,956,711 B2 * | 10/2005 | Hanson et al. | 360/77.04 |
| 6,958,881 B1 | 10/2005 | Codilian et al. | |
| 6,963,465 B1 | 11/2005 | Melkote et al. | |
| 6,963,466 B2 * | 11/2005 | Baum et al. | 360/77.04 |
| 6,965,488 B1 | 11/2005 | Bennett | |
| 6,967,458 B1 | 11/2005 | Bennett et al. | |
| 6,967,811 B1 | 11/2005 | Codilian et al. | |
| 6,970,319 B1 | 11/2005 | Bennett et al. | |
| 6,972,539 B1 | 12/2005 | Codilian et al. | |
| 6,972,540 B1 | 12/2005 | Wang et al. | |
| 6,972,922 B1 | 12/2005 | Subrahmanyam et al. | |
| 6,975,480 B1 * | 12/2005 | Codilian et al. | 360/77.04 |
| 6,977,789 B1 | 12/2005 | Cloke | |
| 6,977,792 B1 * | 12/2005 | Melrose et al. | 360/77.04 |
| 6,980,389 B1 | 12/2005 | Kupferman | |
| 6,987,636 B1 | 1/2006 | Chue et al. | |
| 6,987,639 B1 | 1/2006 | Yu | |
| 6,989,954 B1 | 1/2006 | Lee et al. | |
| 6,992,848 B1 | 1/2006 | Agarwal et al. | |
| 6,992,851 B1 | 1/2006 | Cloke | |
| 6,992,852 B1 | 1/2006 | Ying et al. | |
| 6,995,941 B1 | 2/2006 | Miyamura et al. | |
| 6,995,942 B2 * | 2/2006 | Schmidt | 360/77.04 |
| 6,999,263 B1 | 2/2006 | Melkote et al. | |
| 6,999,266 B1 * | 2/2006 | Schmidt | 360/77.04 |
| 6,999,267 B1 | 2/2006 | Melkote et al. | |
| 7,002,767 B2 | 2/2006 | Annampedu et al. | |
| 7,006,320 B1 | 2/2006 | Bennett et al. | |
| 7,016,134 B1 | 3/2006 | Agarwal et al. | |
| 7,023,637 B1 | 4/2006 | Kupferman | |
| 7,023,640 B1 | 4/2006 | Codilian et al. | |
| 7,027,256 B1 | 4/2006 | Subrahmanyam et al. | |
| 7,027,257 B1 | 4/2006 | Kupferman | |
| 7,035,026 B2 | 4/2006 | Codilian et al. | |
| 7,046,472 B1 | 5/2006 | Melkote et al. | |
| 7,050,249 B1 | 5/2006 | Chue et al. | |
| 7,050,254 B1 | 5/2006 | Yu et al. | |
| 7,050,258 B1 | 5/2006 | Codilian | |
| 7,054,098 B1 | 5/2006 | Yu et al. | |
| 7,061,714 B1 | 6/2006 | Yu | |
| 7,064,918 B1 | 6/2006 | Codilian et al. | |
| 7,068,451 B1 | 6/2006 | Wang et al. | |
| 7,068,459 B1 | 6/2006 | Cloke et al. | |
| 7,068,461 B1 | 6/2006 | Chue et al. | |
| 7,068,463 B1 | 6/2006 | Ji et al. | |
| 7,088,547 B1 | 8/2006 | Wang et al. | |
| 7,095,579 B1 | 8/2006 | Ryan et al. | |
| 7,110,208 B1 | 9/2006 | Miyamura et al. | |
| 7,110,214 B1 | 9/2006 | Tu et al. | |
| 7,113,362 B1 | 9/2006 | Lee et al. | |
| 7,113,365 B1 | 9/2006 | Ryan et al. | |
| 7,116,505 B1 | 10/2006 | Kupferman | |
| 7,126,781 B1 | 10/2006 | Bennett | |
| 7,133,243 B2 | 11/2006 | Hirano et al. | |
| 7,158,329 B1 | 1/2007 | Ryan | |
| 7,180,703 B1 | 2/2007 | Subrahmanyam et al. | |
| 7,184,230 B1 | 2/2007 | Chue et al. | |
| 7,193,809 B1 | 3/2007 | Allen | |
| 7,196,864 B1 | 3/2007 | Yi et al. | |
| 7,199,966 B1 | 4/2007 | Tu et al. | |
| 7,203,021 B1 | 4/2007 | Ryan et al. | |
| 7,209,321 B1 | 4/2007 | Bennett | |
| 7,212,364 B1 | 5/2007 | Lee | |
| 7,212,374 B1 | 5/2007 | Wang et al | |
| 7,215,504 B1 | 5/2007 | Bennett | |
| 7,224,546 B1 | 5/2007 | Orakcilar et al. | |
| 7,248,426 B1 | 7/2007 | Weerasooriya et al. | |
| 7,251,098 B1 | 7/2007 | Wang et al. | |
| 7,253,582 B1 | 8/2007 | Ding et al. | |
| 7,253,989 B1 | 8/2007 | Lau et al. | |
| 7,265,933 B1 | 9/2007 | Phan et al. | |
| 7,289,288 B1 | 10/2007 | Tu | |
| 7,298,568 B2 | 11/2007 | Ehrlich et al. | |
| 7,298,574 B1 | 11/2007 | Melkote et al. | |
| 7,301,717 B1 | 11/2007 | Lee et al. | |
| 7,304,819 B1 | 12/2007 | Melkote et al. | |
| 7,330,019 B1 | 2/2008 | Bennett | |
| 7,330,327 B1 | 2/2008 | Chue et al. | |
| 7,333,280 B1 | 2/2008 | Lifchits et al. | |
| 7,333,290 B1 | 2/2008 | Kupferman | |
| 7,339,761 B1 | 3/2008 | Tu et al. | |
| 7,365,932 B1 | 4/2008 | Bennett | |
| 7,388,728 B1 | 6/2008 | Chen et al. | |
| 7,391,583 B1 | 6/2008 | Sheh et al. | |
| 7,391,584 B1 | 6/2008 | Sheh et al. | |

(56) References Cited

U.S. PATENT DOCUMENTS

| | | |
|---|---|---|
| 7,408,735 B1 | 8/2008 | Coric |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,453,664 B2 * | 11/2008 | Kawabe ............... 360/77.08 |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,477,473 B2 | 1/2009 | Patapoutian et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,502,427 B2 | 3/2009 | Annampedu et al. |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,561,369 B2 * | 7/2009 | Usui et al. ............ 360/77.02 |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,595,955 B2 * | 9/2009 | Hosono et al. ........ 360/77.04 |
| 7,602,568 B1 | 10/2009 | Katchmart |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,889,453 B2 * | 2/2011 | Melrose ............... 360/77.04 |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 7,982,990 B1 * | 7/2011 | Yu et al. ................. 360/39 |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,094,405 B1 * | 1/2012 | Ying et al. ............ 360/77.04 |
| 8,116,023 B1 | 2/2012 | Kupferman |
| 8,145,934 B1 | 3/2012 | Ferris et al. |
| 8,154,822 B1 * | 4/2012 | Yu et al. ............... 360/77.04 |
| 8,179,626 B1 | 5/2012 | Ryan et al. |
| 8,189,286 B1 | 5/2012 | Chen et al. |
| 8,213,106 B1 | 7/2012 | Guo et al. |
| 8,243,382 B2 | 8/2012 | Miles |
| 8,254,222 B1 | 8/2012 | Tang |
| 8,289,642 B1 * | 10/2012 | Yu et al. ................. 360/39 |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,405,928 B1 * | 3/2013 | Yu et al. ............... 360/77.04 |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,550 B1 * | 3/2014 | Sutardja et al. ........ 360/77.04 |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 * | 4/2014 | Xi et al. ............... 360/77.04 |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,011 B1 | 5/2014 | Buch et al. |
| 8,737,013 B2 | 5/2014 | Zhou et al. |

(56) References Cited

U.S. PATENT DOCUMENTS

| | | |
|---|---|---|
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2008/0239555 A1 | 10/2008 | Ehrlich et al. |
| 2009/0244768 A1 | 10/2009 | Maruyama |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |
| 2015/0055239 A1* | 2/2015 | Hara .................. 360/77.04 |

\* cited by examiner

DATA STORAGE DEVICE FILTERING BURST CORRECTION VALUES BEFORE DOWNSAMPLING THE BURST CORRECTION VALUES

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2:
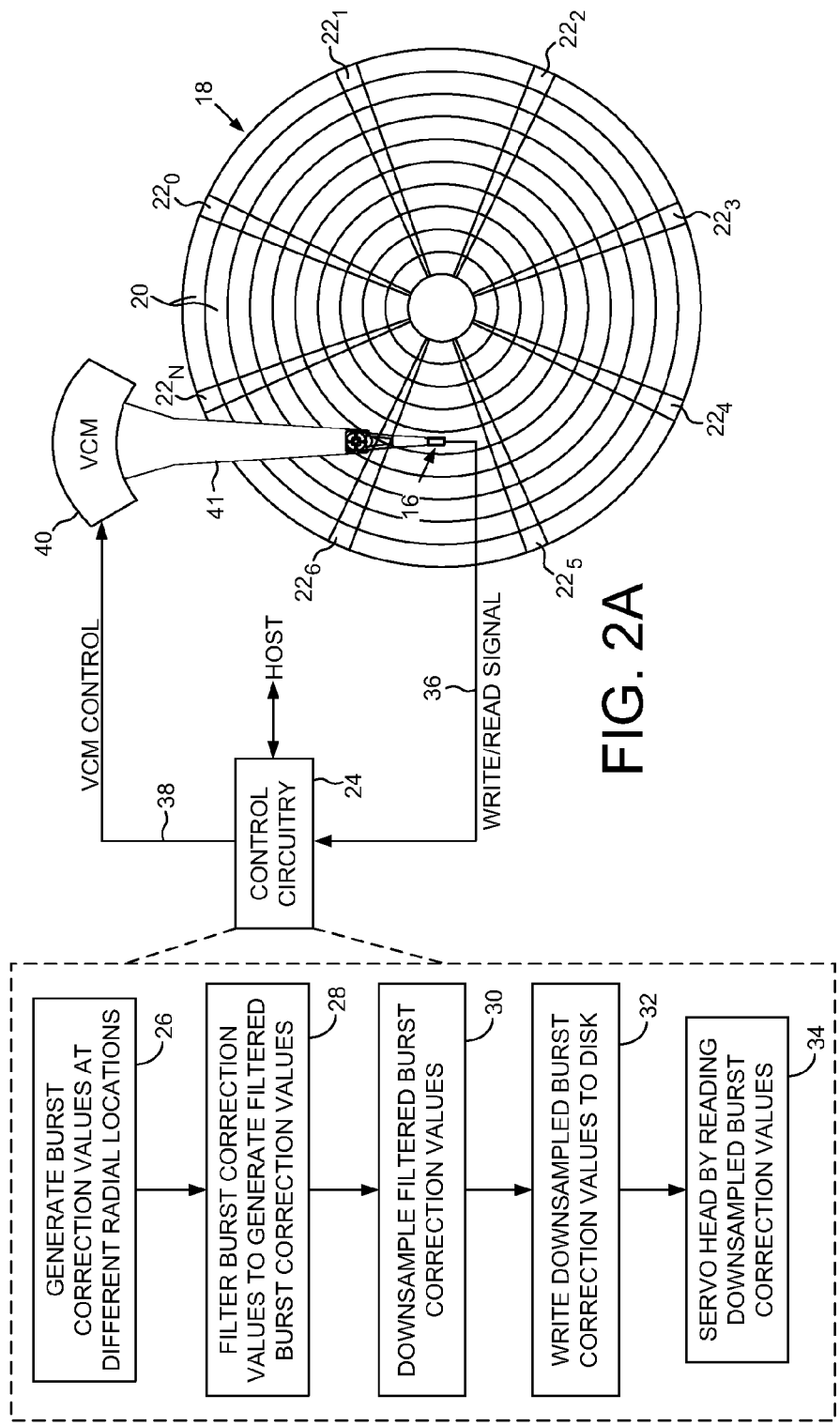
FIG. 2A shows a data storage device in the form of a disk drive according to an embodiment comprising a head actuated over a disk comprising a plurality of servo tracks defined by servo bursts.
FIG. 2B is a flow diagram according to an embodiment wherein burst correction values generated at multiple radial locations across the disk are filtered and then downsampled before the downsampled burst correction values are written to the disk.

FIG. 2A shows a data storage device in the form of a disk drive comprising a head 16 actuated over a disk 18 comprising a plurality of servo tracks 20 defined by servo bursts. The disk drive further comprises control circuitry 24 configured to execute the flow diagram of FIG. 2B, wherein a number of burst correction values are generated by reading at least one of the servo bursts at a number of different radial locations across the disk (block 26). The burst correction values are filtered to generate filtered burst correction values (block 28), and the filtered burst correction values are downsampled to generate downsampled burst correction values (block 30). The downsampled burst correction values are written to the disk (block 32), and the head is servoed over the disk by reading the downsampled burst correction values from the disk (block 34).

Figure 1:
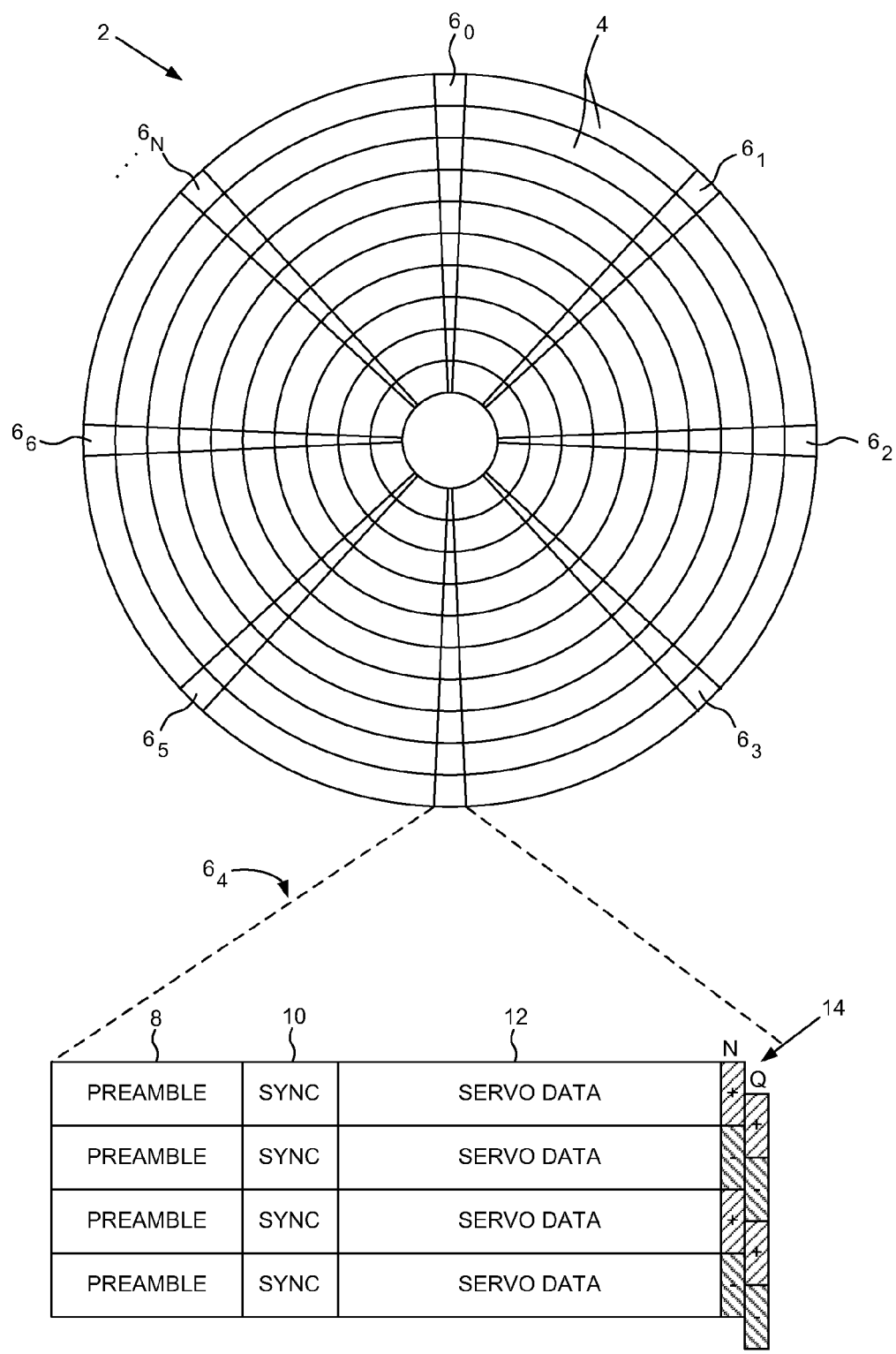
FIG. 1 shows a prior art disk format comprising a plurality of servo tracks defined by servo sectors.

In the embodiment of FIG. 2A, the disk 18 comprises a plurality of servo sectors $22_0$-$22_N$ that define the servo tracks 20, wherein the servo sectors $22_0$-$22_N$ may comprise any suitable head position information, such as a track address for coarse positioning and servo bursts for fine positioning. The servo bursts may comprise any suitable pattern, such as an amplitude based servo pattern or a phase based servo pattern (FIG. 1). Data tracks may be defined relative to the servo tracks 20 at the same or different radial density. The control circuitry 24 processes a read signal 36 emanating from the head 16 to demodulate the servo sectors $22_0$-$22_N$ and generate a position error signal (PES) representing an error between the actual position of the head and a target position relative to a target track. A servo control system in the control circuitry 24 filters the PES using a suitable compensation filter to generate a control signal 38 applied to a voice coil motor (VCM) 40 which rotates an actuator arm 41 about a pivot in order to actuate the head 16 radially over the disk 20 in a direction that reduces the PES.

In one embodiment, imperfections in writing the servo sectors $22_0$-$22_N$ to the disk, including imperfections in writing the servo bursts, induces an error in the PES used to servo the head over a target data track. For example, in one embodiment shown in FIG. 3 the servo bursts may comprise first radially aligned phase based servo bursts (N servo bursts) and second radially aligned phase based servo bursts (Q servo bursts). The seam locations of the servo bursts (where the servo bursts reverse polarity) may be written at incorrect radial positions due to errors in the servo writing process. The written-in errors of the seam locations may induce a repeatable run-out (RRO) error when generating the PES. Accordingly, in one embodiment this RRO error is measured to generate burst correction values that are written to the disk. When servoing the head over a target data track during write/read operations, the burst correction values are read from the disk and used to adjust the PES to reduce the RRO error and therefore reduce the track misregistration (TMR).

Figure 3:
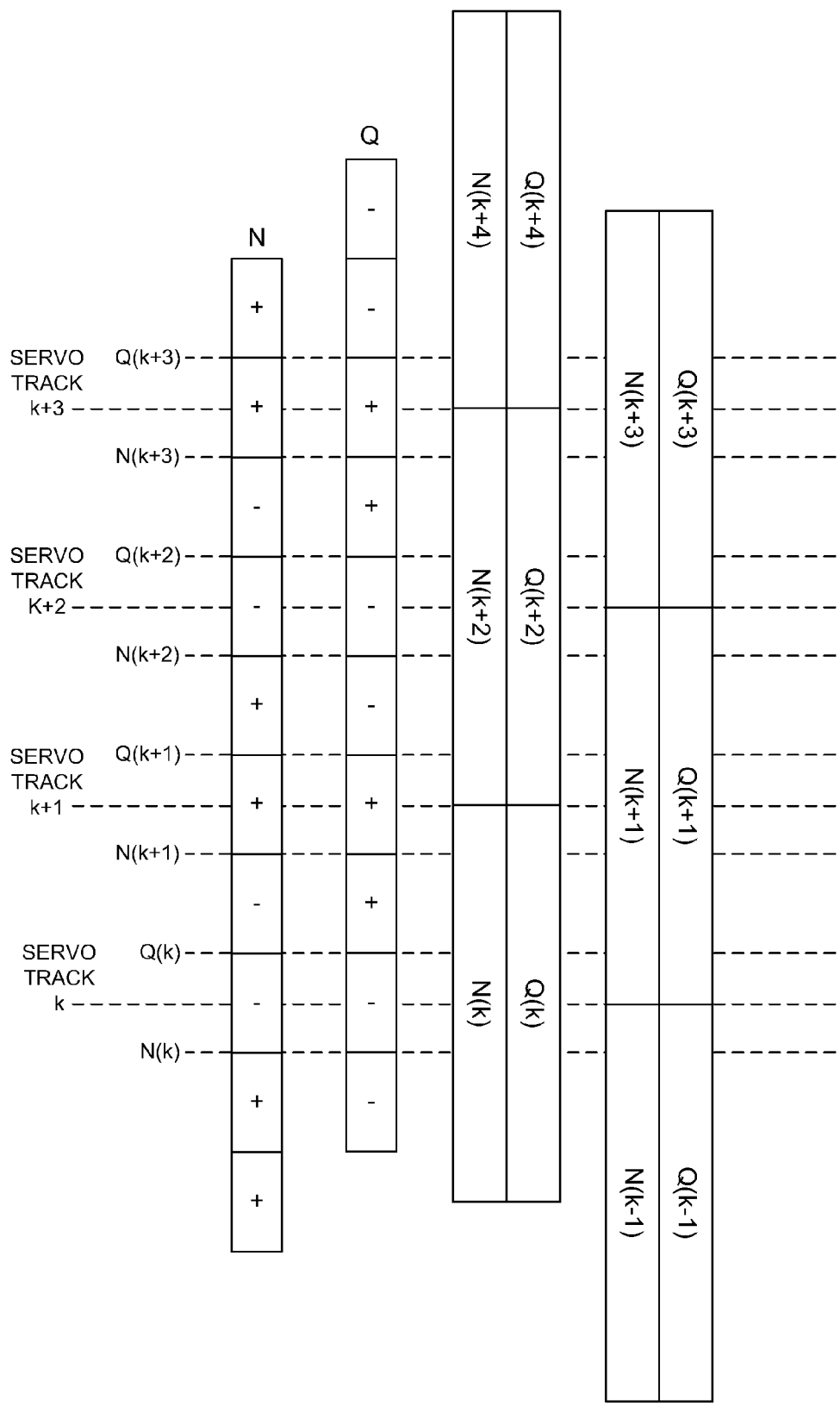
FIG. 3 shows an embodiment wherein an overlapping even and odd set of burst correction values are written to the disk.

Referring again to the example shown in FIG. 3, in one embodiment the head is positioned at a first radial location (e.g., Q(k)) which corresponds to a seam in the phase based servo bursts (the Q servo bursts). A first burst correction value is generated (e.g., burst correction value Q(k)), for example, based on a first position measured from reading at least one of the servo bursts at the first radial location. The head is positioned at a second radial location (e.g., N(k)) which corresponds to a seam in the phase based servo bursts (the N servo bursts). A second burst correction value is generated (e.g., burst correction value N(k)), for example, based on a second position measured from reading at least one of the servo bursts at the second radial location. In the example of FIG. 3, the servo track pitch (distance between servo tracks) spans the length of two servo burst fields, wherein a servo burst seam occurs at one quarter of a servo track offset from the center of a servo track. For example, radial location Q(k) may be one quarter of a servo track toward the outer diameter of the disk away from the center of servo track k, and radial location N(k) may be one quarter of a track toward the inner diameter of the disk away from the center of servo track k. In the embodiment shown in FIG. 3, after generating the first and second burst correction values N(k) and Q(k), the head is positioned over a third radial location (e.g., the center of servo track k) and the burst correction values are written at this third radial location (e.g., at the end of a servo sector).

A similar process is carried out to generate the burst correction values for the other servo tracks. For example, to generate the burst correction values for servo track k−1, the head is positioned at radial location Q(k+1) to generate a Q(k+1) burst correction value and the head is positioned at radial location N(k+1) to generate a N(k+1) burst correction value. The burst correction values are then written to the disk by servoing the head over the center of servo track k+1 as shown in FIG. 3. In one embodiment, the Q(k−1) and N(k−1) burst correction values at least partially overlap in the radial direction as shown in FIG. 3. In general, in one embodiment burst correction values for the even tracks (k, k+2, k+4, etc.) are written in a first radial band and the burst correction values for the odd tracks (k−1, k+3, k+5, etc.) are written in a second radial band, wherein the burst correction values are written in a staggered pattern so that the odd burst correction values at least partially overlap with the even burst correction values as shown in FIG. 3. As described in greater detail below with reference to FIGS. 4-6, in one embodiment this partial overlap of the even and odd burst correction values enables a servo correction value to be generated for any target radial location when servoing the head over a target data track during write/read operations by interpolating between the burst correction values.

Figure 4:
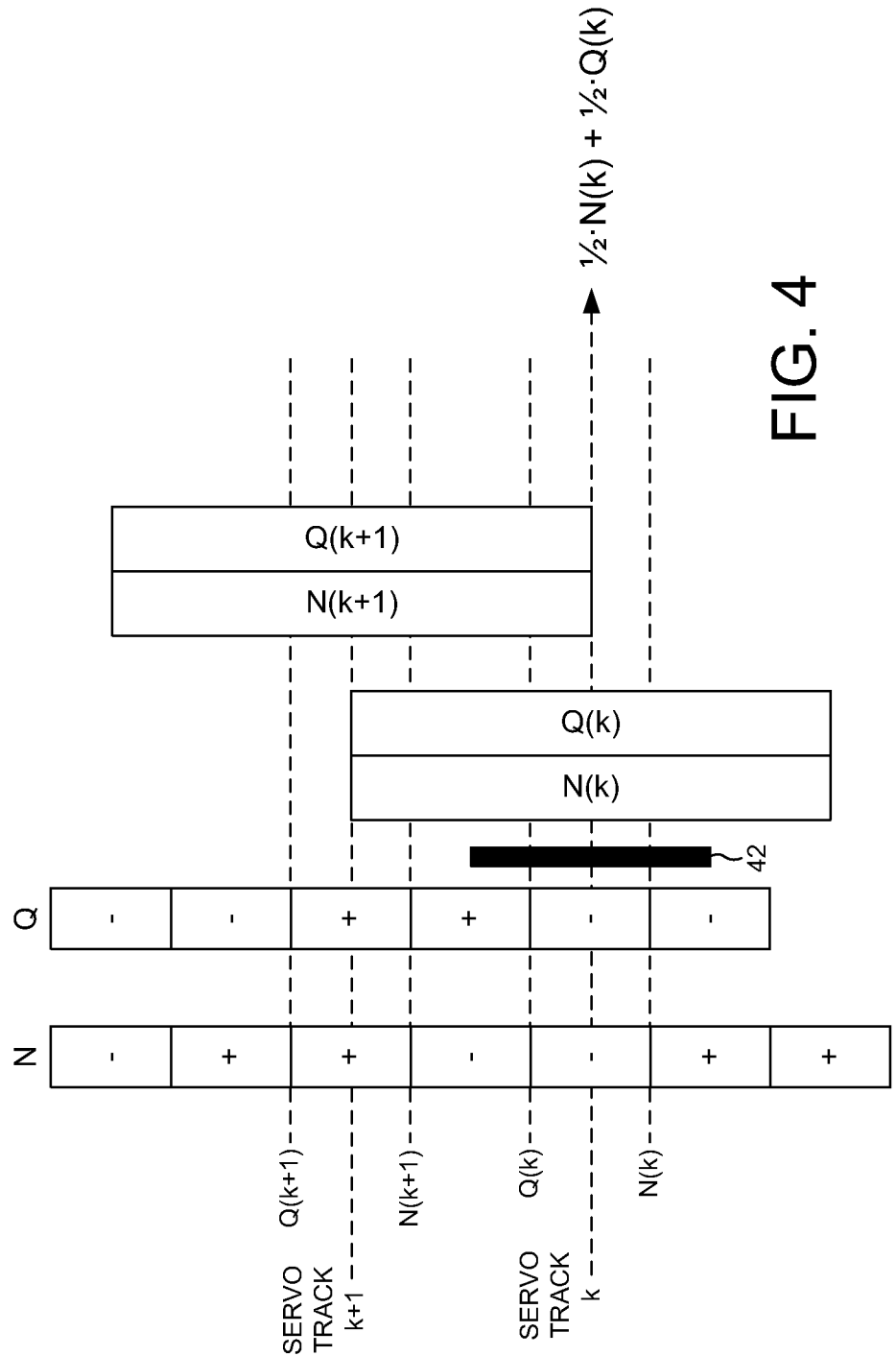
FIGS. 4-6 illustrate embodiments for generating a servo correction value based on scaled percentages of the burst correction values, wherein the scaled percentage for each burst correction value depends on the radial location of the head.

FIG. 4 shows an example embodiment wherein when the read element 42 of the head 16 is servoed over the centerline of servo track k (e.g., during a write or read operation), a servo correction value may be generated based on:

$$\tfrac{1}{2} \cdot N(k) + \tfrac{1}{2} \cdot Q(k)$$

Figure 5:
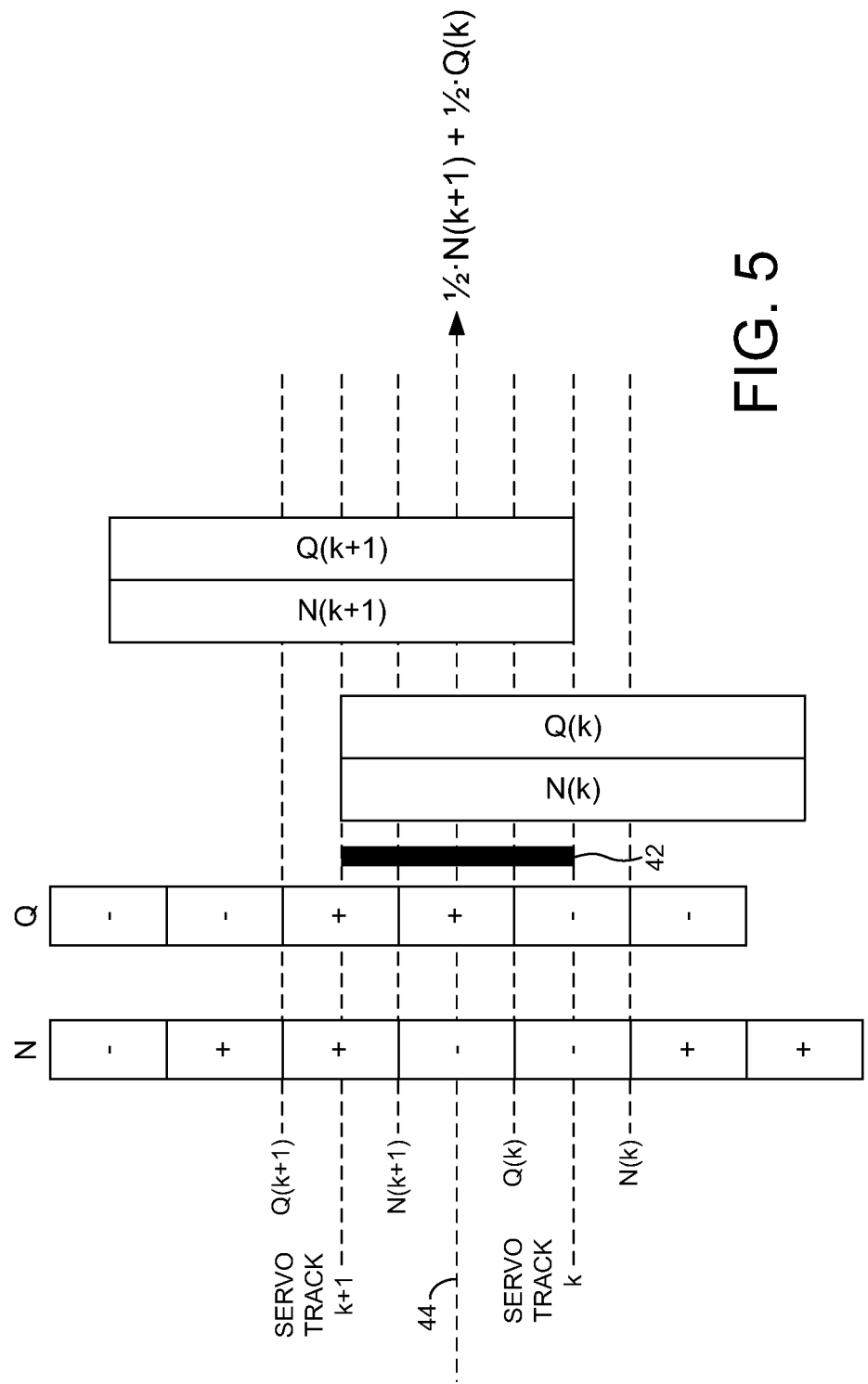

That is, when the read element 42 is centered over the N(k) and Q(k) burst correction values, a servo correction value is generated as the sum of half of each burst correction value which effectively interpolates the burst correction values. The servo correction value is then used to adjust the PES generated at the corresponding servo sector, for example, by subtracting the servo correction value from the PES to attenuate the RRO error. FIG. 5 shows an example embodiment wherein when the read element 42 is servoed over radial location 44 (e.g., during a write or read operation), a servo correction value may be generated based on:

$$\tfrac{1}{2} \cdot N(k+1) + \tfrac{1}{2} \cdot Q(k)$$

Figure 6:
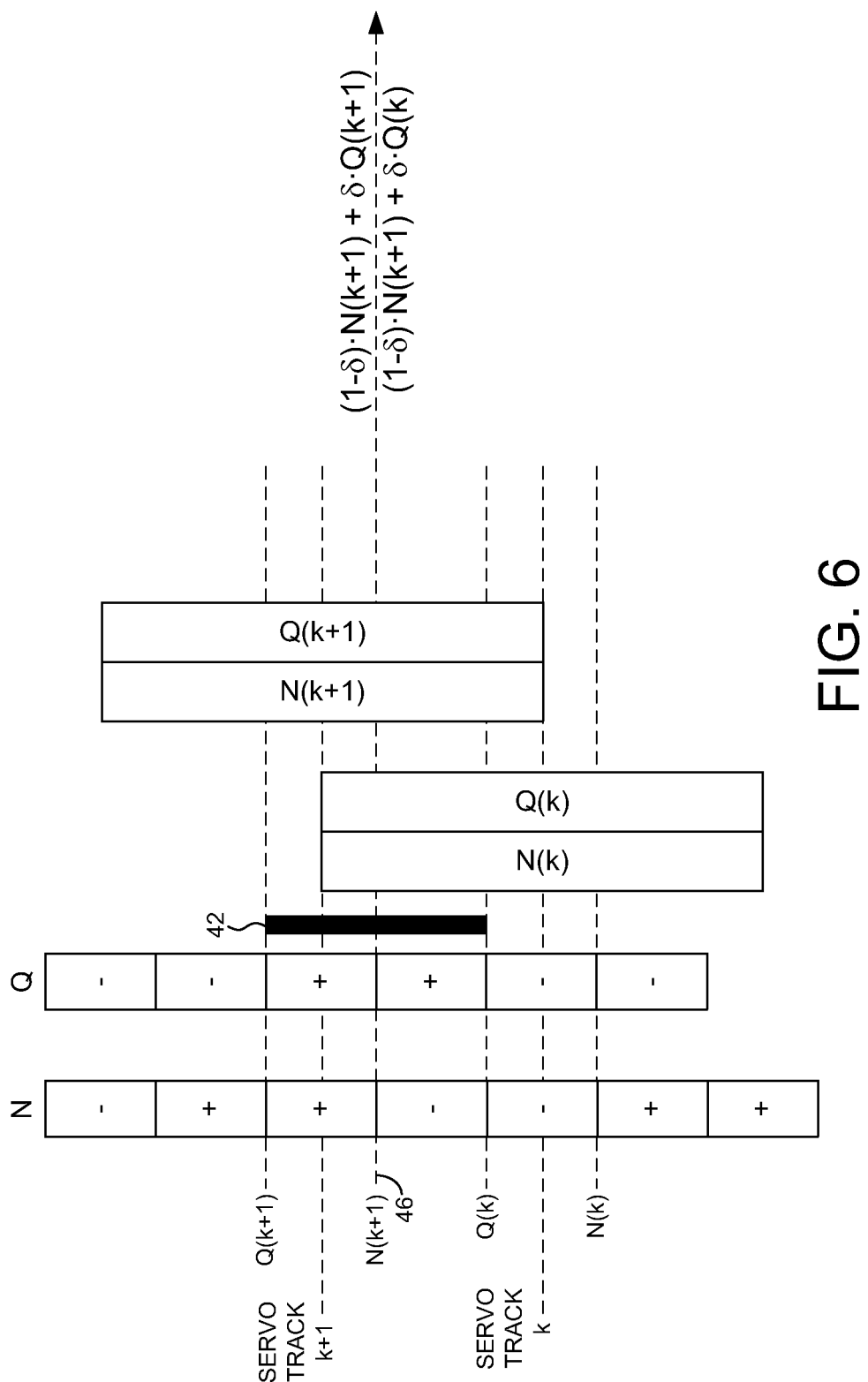

That is, when the read element 42 is positioned over the top half of burst correction value Q(k) and positioned over the bottom half of burst correction value N(k+1), the servo correction value is generated as the sum of half of each burst correction value which again effectively interpolates the burst correction values. FIG. 6 shows an example embodiment wherein when the read element 42 is above radial location 46, the servo correction value may be generated based on:

$$(1-\delta) \cdot N(k-1) + \delta \cdot Q(k+1)$$

and when the read element 42 is below radial location 46, the servo correction value may be generated based on:

$$(1-\delta) \cdot N(k-1) + \delta \cdot Q(k)$$

where $\delta$ is a scalar that ranges from 0 to $\tfrac{1}{2}$ such that the servo correction value is generated based on a corresponding percentage of each burst correction value. In one embodiment, the scalar $\delta$ varies relative to the radial displacement of the read element 42 away from radial location 46 shown in FIG. 6. The resulting servo correction value is effectively an interpolation between the corresponding burst correction values. For example, as the read element 42 moves above radial location 46, the read element 42 is partially over the radial location corresponding to burst correction Q(k+1), but more centered over the radial location corresponding to burst correction N(k+1). When servoing at this radial location (just above radial location 46), the scalar $\delta$ may be configured closer to zero so that the above equation uses a larger percentage of the N(k+1) burst correction value to generate the servo correction value. As the read element 42 moves further above radial location 46, the scalar $\delta$ is increased toward $\tfrac{1}{2}$ until the read element reaches the equivalent radial location as the example shown in FIG. 5. In this manner, a servo correction value may be generated for any radial location by effectively interpolating between the appropriate burst correction values generated at the discrete radial locations across the disk surface.

In one embodiment, the burst correction values (such as N(k) and Q(k) in FIG. 3) may be written with an error correction code (ECC) field (e.g., after Q(k)) that may be used to correct errors when reading the burst correction values from the disk. In another embodiment, in order to increase the format efficiency of the disk, the burst correction values may be written without an ECC field which reserves more area of the disk to record user data. In the embodiment described above with reference to FIG. 6, generating the servo correction value based on a scalar $\delta$ percentage of each burst correction value may help attenuate the effect that a read error has on the servo correction value. For example, if the read element 42 shown in FIG. 6 is just below radial location 46, there is a higher chance of a read error when reading burst correction value Q(k) since part of the read element 42 extends beyond the burst correction value Q(k). However, since the scalar $\delta$ at this radial location will be relatively small (e.g., near zero), the contribution of Q(k) to the servo correction value is small, and therefore a read error in the burst correction value Q(k) is ameliorated.

Figure 7:
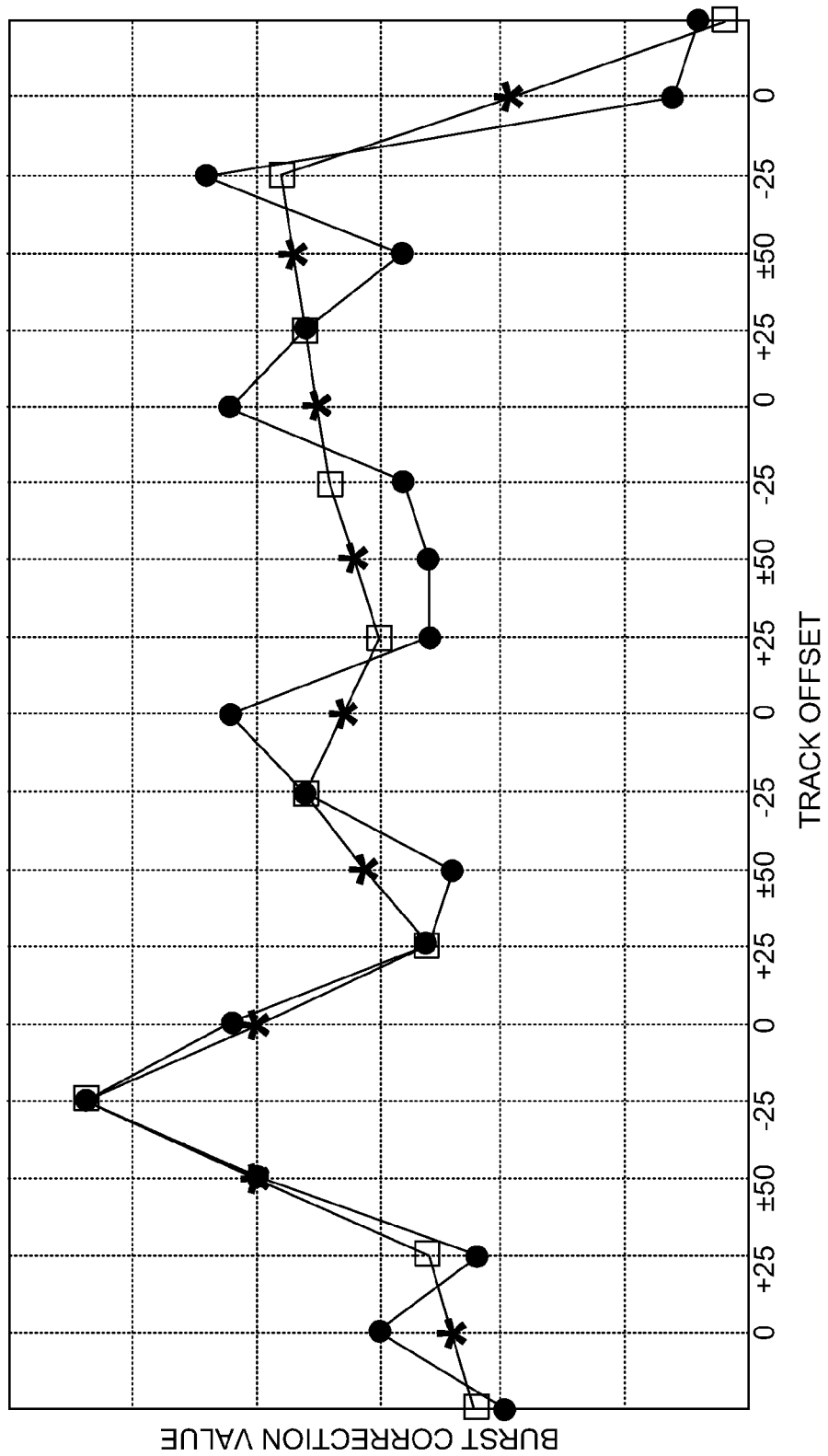
FIG. 7 illustrates an embodiment wherein burst correction values generated at a resolution of a quarter servo track are filtered and then downsampled to a resolution of half servo track.

In one embodiment, interpolating between the burst correction values to generate the intermediate servo correction values may degrade the performance of the servo system due to the error in the interpolated servo correction value. FIG. 7 illustrates this interpolation error wherein the burst correction values are generated at a resolution of a quarter servo track rather than at a resolution of a half servo track as described above with reference to FIG. 3. If the burst correction values generated at radial locations 0 and ±50 (percent) of a servo track were instead generated by interpolating between the burst correction values at radial locations +25 and −25 of a servo track, the error between the interpolated value and the actual value may be significant. Accordingly, in one embodiment the burst correction values are generated at the higher resolution (e.g., a quarter servo track represented by the black dots in FIG. 7) and then filtered before downsampling to the lower resolution (e.g., a half servo track represented by the squares in FIG. 7). In this manner, generating the intermediate servo correction values by interpolating the filtered burst correction values reduces the interpolation error.

Referring again to FIG. 7, the asterisk symbols represent the burst correction values generated by interpolating between the downsampled burst correction values (represented by the squares). In one embodiment, the higher resolution burst correction values (represented by the black dots) are filtered based on an algorithm that attempts to minimize the error between the interpolated values (asterisks) and the actual burst correction values (black dots) at the radial locations represented by 0 and ±50 percent of a servo track, as well as minimize the error between the filtered burst correction values (squares) and the actual burst correction values (block dots) at the radial locations represented by ±25 percent of a servo track (in the example of FIG. 7). Accordingly, in one embodiment the higher resolution burst correction values are filtered based on:

$$L'_n = \begin{cases} \sum_{i=-N}^{N} a_i L_{n+i}, n \in [N+1, m-N] \\ \text{and } n \text{ is even} \\ \frac{1}{2}(L'_{n-1} + L'_{n+1}) = \sum_{i=-N}^{N} a_i \frac{L_{n-1+i} L_{n+1+i}}{2}, \\ n \in [N+1, m-N] \text{ and } n \text{ is odd} \end{cases}$$

where $L'_n$ represents the filtered burst correction values, N represents an order of the filtering, and $a_i$ represents coefficients of the filtering. In order to minimize the above described interpolation error, in one embodiment the coefficients $a_i$ of the filtering are generated based on:

$$\frac{dMSE}{da_j} = 2E\{(L'_n - L_n)L_{n+j}\} + 2E\left\{(L'_{n+1} - L_{n+1})\left(\frac{L_{n+j} + L_{n+2+j}}{2}\right)\right\} = 0,$$

$j \in [-N, N], n$ is even where the E operator computes a mean squared error.

In one embodiment, the filter coefficients $a_i$ may be generated based on the above equations according to:

$$E\left\{\sum_{i=-N}^{N} a_i L_{n+i} L_{n+j}\right\} - E\{L_n L_{n+j}\} +$$

$$\frac{1}{2}E\left\{\sum_{i=-N}^{N} a_i \frac{L_{n+i} + L_{n+2+i}}{2} L_{n+j}\right\} \frac{1}{2}E\left\{\sum_{i=-N}^{N} a_i \frac{L_{n+i} + L_{n+2+j}}{2} L_{n+2+j}\right\} -$$

$$\frac{1}{2}E\{L_{n+1}L_{n+j}\} - \frac{1}{2}E\{L_{n+1}L_{n+2+j}\} = 0,$$

$j \in [-N, N], n$ is even

Define cross correlation for seam location as: $R'_p = E\{L_k L_l\}$, where k is even, p=k−l
Define cross correlation for nonSeam location as: $R''_p = E\{L_k L_l\}$, where k is odd, p=k−l
Choose N=2, then we have:

$(R'_{-4-j}+6R'_{-2-j}+R'_{-j})a_{-2}+(R''_{-3-j}+6R''_{-1-j}+R''_{1-j})a_{-1}+$
$(R'_{-2-j}+6R'_{-j}+R'_{2-j})a_{-0}+(R''_{-1-j}+6R''_{1-j}+$
$R''_{3-j})a_1+(R'_{-j}+6R'_{2-j}+R'_{4-j})a_2=2R''_{-1-j}+$
$4R'_{-j}+2R''_{1-j}j \in [-22]$

The matrix form is:

$$\begin{bmatrix} R'_{-2}+6R'_0+R'_2 & R''_{-1}+6R''_1+R''_3 & R'_0+6R'_2+R'_4 & R''_1+6R''_3+R''_5 & R'_2+6R'_4+R'_6 \\ R'_{-3}+6R'_{-1}+R'_1 & R''_{-2}+6R''_0+R''_2 & R'_{-1}+6R'_1+R'_3 & R''_0+6R''_2+R''_4 & R'_1+6R'_3+R'_5 \\ R'_{-4}+6R'_{-2}+R'_0 & R''_{-3}+6R''_{-1}+R''_1 & R'_{-2}+6R'_0+R'_2 & R''_{-1}+6R''_1+R''_3 & R'_0+6R'_2+R'_4 \\ R'_{-5}+6R'_{-3}+R'_{-1} & R''_{-4}+6R''_{-2}+R''_0 & R'_{-3}+6R'_{-1}+R'_1 & R''_{-2}+6R''_0+R''_2 & R'_{-1}+6R'_1+R'_3 \\ R'_{-6}+6R'_{-4}+R'_{-2} & R''_{-5}+6R''_{-3}+R''_{-1} & R'_{-4}+6R'_{-2}+R'_0 & R''_{-3}+6R''_{-1}+R''_1 & R'_{-2}+6R'_0+R'_2 \end{bmatrix} \begin{bmatrix} a_{-2} \\ a_{-1} \\ a_0 \\ a_1 \\ a_2 \end{bmatrix} = \begin{bmatrix} 2R''_1+4R'_2+2R''_3 \\ 2R''_0+4R'_1+2R''_2 \\ 2R''_{-1}+4R'_0+2R''_1 \\ 2R''_{-2}+4R'_{-1}+2R''_0 \\ 2R''_{-3}+4R'_{-2}+2R''_{-1} \end{bmatrix}$$

The above linear equations may be solved to generate the filter coefficients $a_i$.

After filtering the higher resolution burst correction values the resulting filtered burst correction values $L'_n$ are generated at the same higher resolution. These filtered burst correction values $L'_n$ are then downsampled, for example, by a factor of two resulting in the lower resolution burst correction values (squares in FIG. 7) that are written to the disk such as shown in FIG. 3. When interpolating between the filtered, and downsampled burst correction values (to generate the asterisks in FIG. 7), the resulting interpolation error is reduced. Although the example embodiment of FIG. 7 shows the burst correction values being generated at a quarter servo track before filtering and downsampling to a half servo track, the burst correction values may be generated at any suitable resolution and then downsampled by any suitable factor after filtering.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising a plurality of servo tracks defined by servo bursts;
   a head; and
   control circuitry configured to:
      generate a number of burst correction values by reading at least one of the servo bursts at a number of different radial locations across the disk;
      filter the burst correction values to generate filtered burst correction values;
      downsample the filtered burst correction values to generate downsampled burst correction values;
      write the downsampled burst correction values to the disk; and
      servo the head over the disk by reading the downsampled burst correction values from the disk.

2. The data storage device as recited in claim 1, wherein the control circuitry is further configured to:
   generate an intermediate burst correction value based on at least a first and second one of the downsampled burst correction values read from the disk; and
   servo the head over the disk based on the intermediate burst correction value.

3. The data storage device as recited in claim 2, wherein the control circuitry is further configured to generate the intermediate burst correction value by interpolating the first and second downsampled burst correction values.

4. The data storage device as recited in claim 1, wherein the control circuitry is further configured to filter the burst correction values based on:

$$L'_n = \begin{cases} \sum_{i=-N}^{N} a_i L_{n+i}, n \in [N+1, m-N] \\ \text{and } n \text{ is even} \\ \frac{1}{2}(L'_{n-1} + L'_{n+1}) = \sum_{i=-N}^{N} a_i \frac{L_{n-1+i} L_{n+1+i}}{2}, \\ n \in [N+1, m-N] \text{ and } n \text{ is odd} \end{cases}$$

where:
$L'_n$ represents the filtered burst correction values;
$N$ represents an order of the filtering; and
$a_i$ represents coefficients of the filtering.

5. The data storage device as recited in claim 4, wherein the control circuitry is further configured to generate the coefficients $a_i$ of the filtering based on:

$$\frac{dMSE}{da_j} = 2E\{(L'_n - L_n)L_{n+j}\} + 2E\left\{(L'_{n+1} - L_{n+1})\left(\frac{L_{n+j} + L_{n+2+j}}{2}\right)\right\} = 0,$$

$$j \in [-N, N], n \text{ is even}$$

where the E operator computes a mean squared error.

6. The data storage device as recited in claim 1, wherein the control circuitry is further configured to generate a burst correction value at a centerline of one of the servo tracks, ±25 percent away from the centerline, and ±50 percent away from the centerline.

7. The data storage device as recited in claim 6, wherein the control circuitry is further configured to downsample the filtered burst correction values to generate downsampled burst correction values at ±25 percent away from the centerline.

8. A method of operating a data storage device, the method comprising:
   generating a number of burst correction values by reading at least one of a plurality of servo bursts on a disk at a number of different radial locations across the disk;
   filtering the burst correction values to generate filtered burst correction values;
   downsampling the filtered burst correction values to generate downsampled burst correction values;
   writing the downsampled burst correction values to the disk; and
   servoing the head over the disk by reading the downsampled burst correction values from the disk.

9. The method as recited in claim 8, further comprising:
   generating an intermediate burst correction value based on at least a first and second one of the downsampled burst correction values read from the disk; and
   servoing the head over the disk based on the intermediate burst correction value.

10. The method as recited in claim 9, further comprising generating the intermediate burst correction value by interpolating the first and second downsampled burst correction values.

11. The method as recited in claim 8, further comprising filtering the burst correction values based on:

$$L'_n = \begin{cases} \sum_{i=-N}^{N} a_i L_{n+i}, n \in [N+1, m-N] \text{ and } n \text{ is even} \\ \frac{1}{2}(L'_{n-1} + L'_{n+1}) = \sum_{i=-N}^{N} a_i \frac{L_{n-1+i} L_{n+1+i}}{2}, \\ n \in [N+1, m-N] \text{ and } n \text{ is odd} \end{cases}$$

where:

$L'_n$ represents the filtered burst correction values;

N represents an order of the filtering; and $a_i$ represents coefficients of the filtering.

12. The method as recited in claim 11, further comprising generating the coefficients $a_i$ of the filtering based on:

$$\frac{dMSE}{da_j} = 2E\{(L'_n - L_n)L_{n+j}\} + 2E\left\{(L'_{n+1} - L_{n+1})\left(\frac{L_{n+j} + L_{n+2+j}}{2}\right)\right\} = 0,$$

$j \in [-N, N]$, $n$ is even where the E operator computes a mean squared error.

13. The method as recited in claim 8, further comprising generating a burst correction value at a centerline of one of the servo tracks, ±25 percent away from the centerline, and ±50 percent away from the centerline.

14. The method as recited in claim 13, further comprising downsampling the filtered burst correction values to generate downsampled burst correction values at ±25 percent away from the centerline.

* * * * *